US010257792B2

(12) United States Patent
Fodor et al.

(10) Patent No.: US 10,257,792 B2
(45) Date of Patent: Apr. 9, 2019

(54) MAXIMUM POWER REDUCTION FOR FULL DUPLEX COMMUNICATIONS

(71) Applicant: Telefonaktiebolaget LM Ericsson (publ), Stockholm (SE)

(72) Inventors: Gabor Fodor, Hässelby (SE); Magnus Frodigh, Sollentuna (SE); Muhammad Kazmi, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 175 days.

(21) Appl. No.: 15/100,660

(22) PCT Filed: Apr. 12, 2016

(86) PCT No.: PCT/SE2016/050316
§ 371 (c)(1),
(2) Date: Jun. 1, 2016

(87) PCT Pub. No.: WO2017/180031
PCT Pub. Date: Oct. 19, 2017

(65) Prior Publication Data
US 2018/0098291 A1 Apr. 5, 2018

(51) Int. Cl.
*H04W 52/14* (2009.01)
*H04W 52/34* (2009.01)
(Continued)

(52) U.S. Cl.
CPC .......... *H04W 52/367* (2013.01); *H04W 52/14* (2013.01); *H04W 52/346* (2013.01); *H04W 52/54* (2013.01); *H04W 52/146* (2013.01)

(58) Field of Classification Search
CPC ............................ H04W 52/367; H04W 52/14
(Continued)

(56) References Cited

U.S. PATENT DOCUMENTS 8,861,443 B2 10/2014 Shirani-Mehr et al.
2014/0044023 A1* 2/2014 Kazmi .................. H04W 28/18
370/278

(Continued)

FOREIGN PATENT DOCUMENTS

| EP | 2014/041480 | * 3/2014 | ............ H04W 52/36 |
|---|---|---|---|
| WO | 2014041480 A1 | 3/2014 | |
| WO | 2015174733 A1 | 11/2015 | |

OTHER PUBLICATIONS

3GPP, "3rd Generation Partnership Project; Technical Specification Group Radio Access Network; Evolved Universal Terrestrial Radio Access (E-UTRA); User Equipment (UE) radio transmission and reception (Release 13)", 3GPP TS 36.101 V13.3.0, Mar. 2016, 1-928.

(Continued)

*Primary Examiner* — Yuwen Pan
*Assistant Examiner* — Fatuma G Sherif
(74) *Attorney, Agent, or Firm* — Murphy, Bilak & Homiller, PLLC

(57) ABSTRACT

The disclosure relates to transmission power control for Full Duplex, FD, Communications. In particular it relates to methods in a wireless device and in a network node of controlling Full Duplex, FD, transmission power using Maximum Power Reduction, MPR, parameters for FD Communications and to a corresponding network node, wireless device and computer program. According to some aspects, the disclosure relates to a method, performed in a wireless device 10, being served by a network node 20, for controlling Full Duplex, FD, transmission power. The method comprises receiving (S1), from the network node, information indicative of a downlink transmission power of the network node, and obtaining (S3) at least one Full Duplex maximum power reduction parameter, based on the received information. The method further comprises determining (S4) uplink transmission power based on the at least one Full Duplex maximum power reduction parameter and transmitting (S5) an uplink signal to the network node, with the determined uplink transmission power, in the FD mode. Thereby, Full Duplex maximum power reduction parameters can be set such that the total emitted power by the wireless device and the network node together will stay within predefined limits.

20 Claims, 8 Drawing Sheets

(51) Int. Cl.
*H04W 52/36* (2009.01)
*H04W 52/54* (2009.01)

(58) Field of Classification Search
USPC .............................................. 455/522, 69, 78
See application file for complete search history.

(56) References Cited

U.S. PATENT DOCUMENTS

| | | | | |
|---|---|---|---|---|
| 2014/0086195 | A1* | 3/2014 | Jung | H04W 52/146 |
| | | | | 370/329 |
| 2016/0020894 | A1* | 1/2016 | Tetzlaff | H04L 5/1461 |
| | | | | 370/278 |
| 2017/0078971 | A1* | 3/2017 | Noh | H04W 88/08 |
| 2017/0302337 | A1* | 10/2017 | Liu | H04B 7/005 |

OTHER PUBLICATIONS

Thilina, Karaputugala M. et al., "Medium Access Control Design for Full Duplex Wireless Systems: Challenges and Approaches", IEEE Communications Magazine, vol. 53, Issue 5, May 14, 2015, 112-120.
Xie, Xiufeng et al., "Does Full-Duplex Double the Capacity of Wireless Networks?", IEEE Conference on Computer Communications, 2014, 253-261.
Bento, T. et al., "FM-MAC: A novel MAC protocol for in-band full-duplex systems that use multipacket reception", 2015 IEEE Globecom Workshops, Dec. 6, 2015, 1-6.

\* cited by examiner

S10
Detecting a condition indicating that at least one full duplex maximum power reduction, Full Duplex Maximum Power Reduction, parameter needs to be obtained by the wireless device

S11
Determining an interference condition between the wireless device and the network node

S12
Calculating at least one Full Duplex Maximum Power Reduction parameter based on at least one parameter related to uplink transmissions from the wireless device and on at least one parameter related to downlink transmissions from the network node

S13
Providing, in response to the detecting, information indicative of downlink transmission power of the network node and/or at least one Full Duplex Maximum Power Reduction parameter calculated based on the downlink transmission power of the network node, to the wireless device and

S14
Transmitting a trigger defining when to start applying the at least one Full Duplex Maximum Power Reduction parameter, to the wireless device

S15
Transmitting a downlink signal to the wireless device in the Full Duplex mode, with the downlink transmission power indicated to the wireless device

FIG. 3

MAXIMUM POWER REDUCTION FOR FULL DUPLEX COMMUNICATIONS

TECHNICAL FIELD

The disclosure relates to transmission power control for Full Duplex, FD, communications. In particular it relates to methods of controlling FD transmission power using Maximum Power Reduction, MPR, parameters for FD communications and to a corresponding network node, wireless device and computer program.

BACKGROUND

3GPP Long Term Evolution, LTE, is the fourth-generation mobile communication technologies standard developed within the 3rd Generation Partnership Project, 3GPP, to improve the Universal Mobile Telecommunication System, UMTS, standard to cope with future requirements in terms of improved services such as higher data rates, improved efficiency, and lowered costs. The Universal Terrestrial Radio Access Network, UTRAN, is the radio access network of a UMTS and Evolved UTRAN, E-UTRAN, is the radio access network of an LTE system. In an UTRAN and an E-UTRAN, a User Equipment, UE, is wirelessly connected to a Radio Base Station, RBS, commonly referred to as a NodeB, NB, in UMTS, and as an evolved NodeB, eNodeB or eNB, in LTE. A base station is a general term for a radio network node capable of transmitting radio signals to a UE and receiving signals transmitted by a UE.

In-band Full Duplex, FD,—or full duplex for short—technology makes it possible that a wireless node transmits and receives communication signals using overlapping or even identical frequency resources for reception and transmission simultaneously. It is intuitively clear that FD communication may double the spectral efficiency, although this upper bound is typically not reachable in practice. However, FD communication has the potential to increase the spectral efficiency due to the progress in designing self-interference, SI, cancellation receivers that can reach up to 80-90 dB or even higher SI cancellation capabilities. This level of SI capability can be sufficient, especially in small cell networks, where the typical distance and large scale fading between the radio network node and wireless device is relatively small to increase the spectral efficiency of FD links as compared with Half Duplex, HD, links.

The transmission modes in FD communication systems can be categorized in terms of the involved nodes and their capabilities. Bidirectional Full Duplex, BFD, communication involves a pair of FD capable nodes that send and receive signals to one other on the same frequency channel at the same time. In contrast, in Three-Node FD, TNFD, communication a FD capable node communicates with two other (not necessarily FD capable) nodes such that the FD capable node transmits and receives signals to/from the non-FD capable nodes on the same frequency channel simultaneously.

Controlling the wireless device transmit power plays an important role in uplink, UL, Quality of Service, QoS, management, intercell interference, ICIC, mitigation and complying with regulatory constraints in terms of radio frequency, RF, spectrum emissions. In LTE, UL power control is supported by various parameters and measurements on reference signals that enable a UE to determine its transmit power levels on the physical resource blocks, PRB, that the UE is scheduled on.

For LTE, the maximum allowed UL transmit power depends on the power class that the UE belongs to. For example, for UEs of Class-3, the maximum transmit power is 23 dBm+/−2 dB for all allowed frequency bands. In addition, the maximum power reduction, MPR, parameter (specified in 3GPP TS 36.101 V13.3.0 (2016-03)) requires the UE to further reduce its maximum transmit power by 1 or 2 dB depending on the modulation scheme and the bandwidth configuration used by the UE for the UL transmission.

In addition to the MPR parameter, the network can signal the Additional MPR, A-MPR, to the UE. The A-MPR specifies an additional power reduction depending on the frequency band, channel bandwidth, the number of physical resource blocks allocated and the modulation depth. The MPR and A-MPR parameters enable the UE to comply with requirements related to spurious emissions, Adjacent Channel Leakage power Ratio, ACLR, additional spurious emission and Out-Of-Band, OOB, emission (in parts specified in 3GPP TS 36.101 V13.3.0 (2016-03)) that are part of the UE RF testing aspects according to 3GPP TS 36.521-1 V13.1.0 (2016-03).

However, when the wireless access point (e.g. a base station) and the served user equipment are capable of BFD or TNFD communications, the maximum power reduction, MPR, and the additional maximum power reduction, A-MPR, parameters do not help the wireless network to comply with the regulatory rules concerning the RF aspects of UE transmissions. Hence, there is a need for improved methods of controlling power in BFD or TNFD communications.

SUMMARY

The general object or idea of embodiments of the present disclosure is to address at least one or some of the disadvantages with the prior art solutions described above as well as below.

The idea is to use additional parameters signaled to the wireless device by a radio access node, herein referred to as a network node, to limit the maximum transmit power level in Full Duplex, FD, communication modes such that the simultaneous transmission complies with regulatory requirements concerning spurious emissions and out-of-band emissions. A key difference with regards to existing solution is that the values of Full Duplex maximum power reduction parameters are derived based on parameters related to both uplink, UL, and downlink, DL, transmissions in FD mode. These additional parameters are used to limit the maximum transmit power that is allowed by the wireless device when using FD radio bearers.

According to some aspects, the disclosure relates to a method, performed in a wireless device 10, being served by a network node 20, for controlling Full Duplex, FD, transmission power. The method comprises receiving, from the network node, information indicative of a downlink transmission power of the network node, and obtaining at least one Full Duplex maximum power reduction parameter, based on the received information. The method further comprises determining uplink transmission power based on the at least one Full Duplex maximum power reduction parameter and transmitting an uplink signal to the network node, with the determined uplink transmission power, in the FD mode. Thereby, Full Duplex maximum power reduction parameters can be set such that the total emitted power by the wireless device and the network node together will stay within predefined limits. One advantage provided by the solution over existing techniques is that it enables the wireless network to operate in FD modes (BFD or TNFD) and comply with requirements related to wireless device RF behaviour including output radio spectrum emissions, such as adjacent channel leakage and spurious emissions. Thus, the proposed methods can be seen as a basic practical enabler of full duplex communication that complies with regulatory constraints and wireless device RF testing procedures.

According to some aspects, the method comprises detecting a condition triggering the wireless device to obtain at least one Full Duplex maximum power reduction parameter. Thereby, the Full Duplex maximum power reduction parameters may be updated when outdated or when new values are expected to be needed.

According to some aspects, the receiving comprises receiving at least one Full Duplex maximum power reduction parameter calculated based on downlink transmission power, from the network node. Thus, the full duplex maximum power reduction parameter can be calculated in the network and signaled to the wireless device.

According to some aspects, the obtaining comprises autonomously obtaining at least one Full Duplex maximum power reduction parameter in the wireless device, based on the received information. Thereby, the wireless device may itself compute the at least one Full Duplex maximum power reduction parameter using predefined formulas, once the uplink transmission power and possibly also other parameters are provided to the wireless device.

According to some aspects, the method comprises receiving a trigger defining when to start applying the at least one Full Duplex maximum power reduction parameter when determining uplink transmission power. Hence, the use of the obtained at least one Full Duplex maximum power reduction parameter can be controlled.

According to some aspects, the obtaining comprises calculating at least one Full Duplex maximum power reduction parameter based on at least one parameter related to uplink transmissions from the wireless device and on at least one parameter related to downlink transmissions from the network node. By using different parameters all relevant information in both the network node and the wireless device may be taken into account.

According to some aspects, the method comprises determining an interference condition between the wireless device and the network node. Then the at least one Full Duplex maximum power reduction parameter, is also obtained based on the determined interference condition. Hence, impact of interference may be considered when determining one Full Duplex maximum power reduction parameters.

According to some aspects, the wireless device is already configured with at least one Full Duplex Maximum Power Reduction, parameter and wherein the application of the obtained, Full Duplex Maximum Power Reduction, parameters implies an adjustment of the present Full Duplex maximum power reduction parameters. Thus, the Full Duplex maximum power reduction parameters may be continuously updated.

According to some aspects, the disclosure relates to a method, performed in a network node serving a wireless device, for controlling Full Duplex, FD, transmission power. The method comprising detecting a condition indicating that at least one full duplex maximum power reduction, Full Duplex Maximum Power Reduction, parameter needs to be obtained by the wireless device and providing, in response to the detecting, information indicative of downlink transmission power of the network node and/or at least one Full Duplex maximum power reduction parameter calculated based on the downlink transmission power of the network node, to the wireless device. The method further comprises transmitting a downlink signal to the wireless device in the Full Duplex mode, with the downlink transmission power indicated to the wireless device. Thereby, the Full Duplex maximum power reduction parameters can be calculated taking both uplink and downlink into account.

According to some aspects, the at least one Full Duplex maximum power reduction parameter comprises one Full Duplex Maximum Power Reduction parameter and/or one Full Duplex Additional Maximum Power Reduction parameter, FD-A-MPR parameter. According to some aspects, the Full Duplex Maximum Power Reduction and FD-A-MPR are derived based on different sets of parameters. Hence, the standard LTE parameters may be used, but additionally DL parameters are also taken into account when calculating the maximum power.

According to some aspects, the disclosure relates to a computer program comprising computer program code which, when executed, causes a wireless device to execute the methods described above and below. According to some aspects, the disclosure relates to computer program comprising computer program code which, when executed, causes a network node to execute the methods described above and below.

According to some aspects, the disclosure relates to a wireless device being configured for controlling transmission power of FD transmissions. The wireless device comprises radio circuitry configured for Full Duplex, FD, communication with a network node and processing circuitry. The processing circuitry is configured to cause the wireless device to receive from the network node, information indicative of a downlink transmission power of the network node, to obtain at least one Full Duplex maximum power reduction parameter, based on the received information, to determine uplink transmission power based on the at least one Full Duplex maximum power reduction parameter and to transmit an FD uplink signal to the network node with the determined uplink transmission power. The aspects regarding the wireless device corresponds to the aspects regarding the above mentioned method and it therefore has the same advantages as the corresponding method.

According to some aspects, the disclosure relates to a network node, in a communication system, the network node being configured for controlling transmission power of FD transmissions. The network node comprises a radio communication interface radio circuitry configured for Full duplex, FD, communication with a wireless device, a network communication interface configured for communication with other network nodes, and processing circuitry. The processing circuitry is configured to cause the network node to detect a condition indicating that at least one full duplex maximum power reduction, Full Duplex Maximum Power Reduction, parameter needs to be obtained by the wireless device, to provide, in response to the detecting, information indicative of downlink transmission power of the network node and/or at least one Full Duplex maximum power reduction parameter calculated based on the downlink transmission power of the network node, to the wireless device and to transmit a FD data signal in the Full Duplex mode with the downlink transmission power indicated to the wireless device. The network node corresponds to method therefore has the same advantages as the corresponding method.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which:

FIG. 3 is a flow chart illustrating the proposed method performed in a network node according to some aspects of the disclosure.

DETAILED DESCRIPTION

Figure 1:
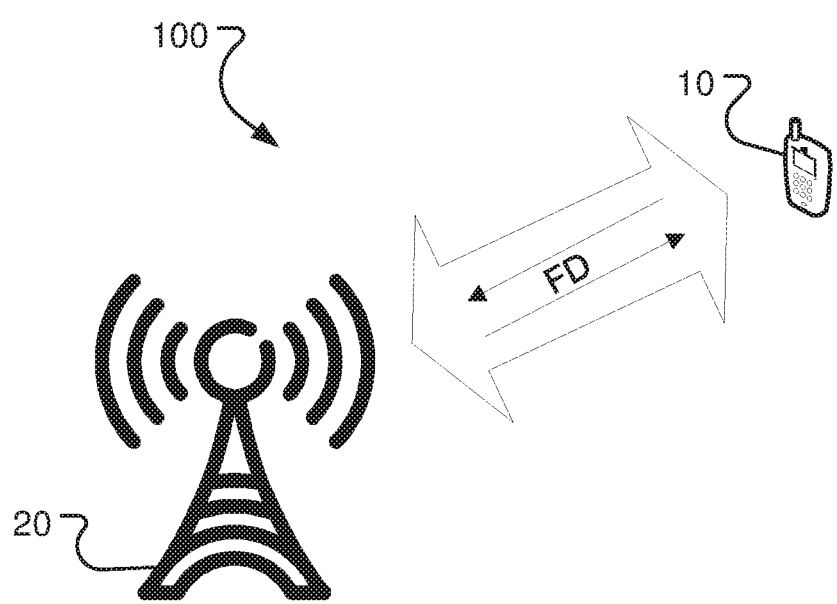
FIG. 1 illustrates a network node and a wireless device in FD communication.

Aspects of the present disclosure will be described more fully hereinafter with reference to the accompanying drawings. The device and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

For better understanding of the invention, the Maximum Power Parameters, MPR, used in HD mode in LTE will be briefly described. In LTE MPR is typically based on channel configuration and modulation. For UE Power Class 3, the allowed Maximum Power Reduction, MPR, for the nominal maximum output power in 6.2.2 of 3GPP TS 36.101 v13.3.0 (2016-03) due to higher order modulation and transmit bandwidth configuration (resource blocks) is specified in Table 6.2.3-1 of 3GPP TS 36.101 v13.3.0 (2016-03).

TABLE 6.2.3-1

Maximum Power Reduction (MPR) for Power Class 1 and 3

| | Channel bandwidth/Transmission bandwidth ($N_{RB}$) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |
| 64 QAM | ≤5 | ≤4 | ≤8 | ≤12 | ≤16 | ≤18 | ≤2 |
| 64 QAM | >5 | >4 | >8 | >12 | >16 | >18 | ≤3 |

Additional Adjacent Channel Leakage Ratio, ACLR, and spectrum emission requirements can be signalled by the network to indicate that the UE shall meet also additional requirements in a specific deployment scenario. To meet these additional requirements the concept of A-MPR is introduced.

A problem is that the signaled MPR and A-MPR parameters are designed assuming that only the UE emits energy on the physical resource blocks on which the UE is scheduled. Therefore, the total emitted power and consequently also the spurious/OOB emissions and the adjacent channel leakage can become higher than the maximum allowed level on Physical Resource Blocks, PRBs, and resource elements that are used for FD transmissions. This problem can be particularly severe when the network node and the UE are close to one another and/or when the applied power control algorithms aim at maximizing the spectral efficiency rather than limiting the unwanted emissions As discussed above the maximum power reduction, MPR, and the additional maximum power reduction, A-MPR, parameters do not help the wireless network to comply with the regulatory rules concerning the RF aspects of UE transmissions, when operating in FD mode. The reason for this is that in FD mode, the UE and the network node transmit simultaneously on the same frequency channels and cause power emissions on the same spectrum bands. In the existing solutions the MPR/A-MPR used in HD mode depend only on operating parameters related to UE uplink transmissions.

There are prior art documents describing methods for minimizing the interference level in a full duplex wireless networks. E.g. U.S. Pat. No. 8,861,443 B2 discloses a method that minimizes the interference level in a full duplex wireless network. However, the joint out of band transmission issue in a FD network is not addressed in this document.

Furthermore international patent application WO 2015/174733 A1 describes signaling procedures that can be used to signal, to a terminal, power control information on uplink transmission power and receiving an uplink transmitted signal on the basis of the power control information. However, the joint out of band transmission issue in a FD network is not addressed in this document.

To solve the above mentioned problems in FD mode, this disclosure proposes to derive, the values of FD-MPR and FD-A-MPR based on new rules and principles as described below. These rules are typically implemented and applied in the network node. However, the rules may also be pre-defined and/or configured at the UE. For example, the UE may also autonomously derive or modify the values of FD-MPR and/or FD-A-MPR based on such pre-defined rules and/or configuration from the network node.

The core idea is to, in comparison to the prior art, use additional Downlink, DL, parameters signaled to the wireless device, when deriving the FD-MPR and FD-A-MPR, in order to limit the maximum transmit power level in FD communication modes such that the simultaneous transmission complies with regulatory requirements concerning spurious emissions and out-of-band emissions. Hence, one key difference with regards to TS 36.101 v13.3.0 (2016-03) is that the values of FD-MPR/FD-A-MPR are derived based on parameters related to both UL and DL transmissions in FD mode. These additional parameters are used to limit the maximum transmission power that is allowed by the UE when using FD radio bearers.

FIG. 1 depicts an exemplifying radio communications system 100 in which embodiments herein may be implemented. The radio communication system 100 comprises a network node 20. A network node 20 in this application generally refers to a radio base station or access point, i.e. a radio network node capable of transmitting radio signals to a wireless device and receiving signals transmitted by a wireless device. The system also comprises a wireless device 10. The network node 20 and the wireless device 10 are communicating using Full Duplex, FD, communication. The system also comprises further parallel network nodes as wireless devices (not shown).

In this example, the radio communications system 100 is a Long Term Evolution, LTE, system. In other examples, the radio communication system may be any Third Generation Partnership Project, 3GPP, cellular communication system, such as future communication systems also referred to as 5G.

The purpose of the proposed methods is to provide means to enable avoiding that the total emitted power and consequently also the spurious/OOB emissions and the adjacent channel leakage can become higher than the maximum allowed power level on PRBs and resource elements that are used for Full Duplex, FD transmissions. This problem can be particularly severe when the network node and the wireless device are close to one another and both nodes may use high transmit power levels due to the high self-interference suppression capabilities. The methods solve this problem by providing new rules for deriving and signalling FD-MPR and FD-A-MPR, which will now be described below and further explained.

Figure 4:
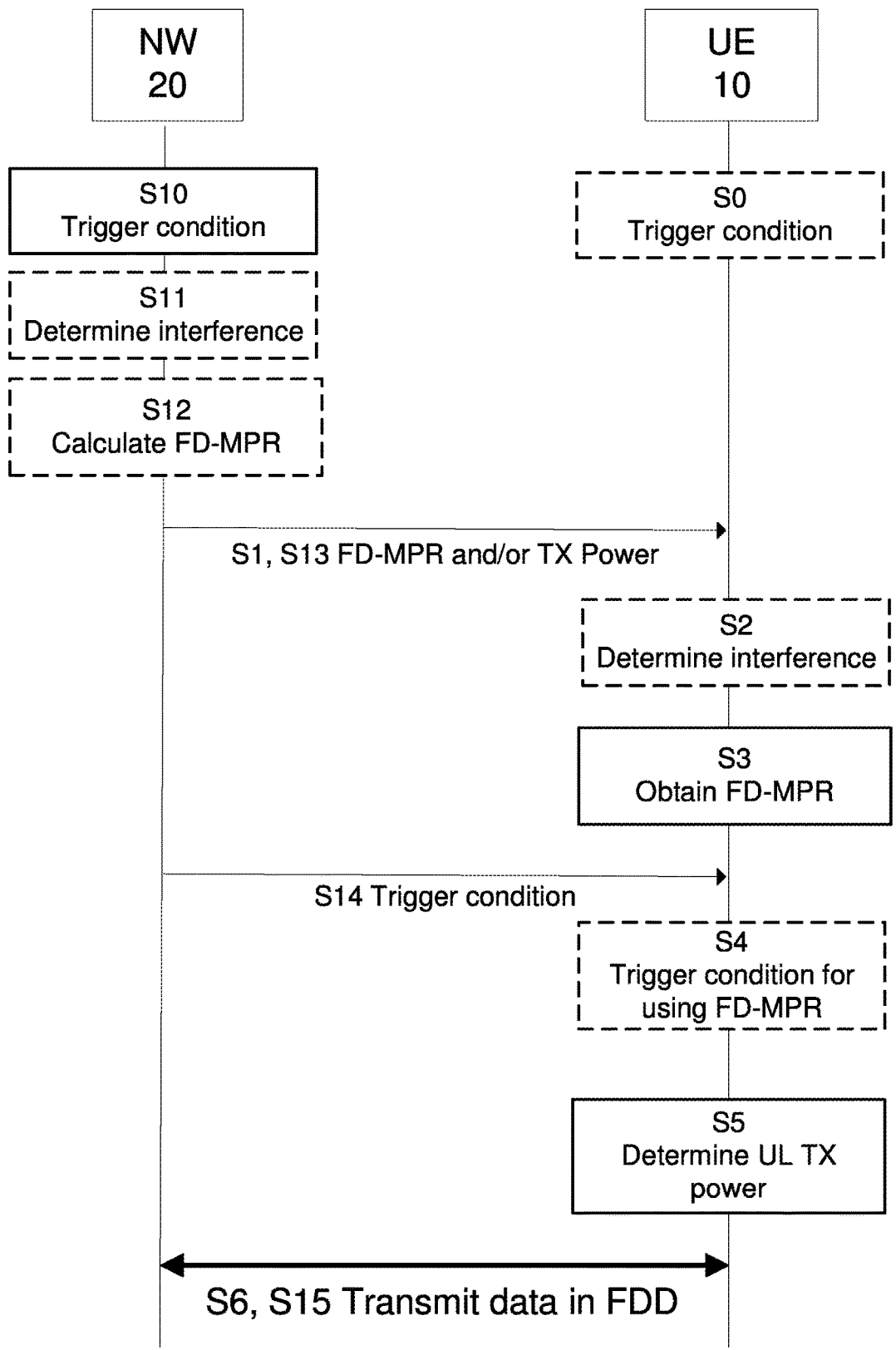
FIG. 4 illustrates signaling between a network node and a wireless device when controlling total emitted power.

The proposed methods will be described in more detail referring to FIGS. 2, 3 and 4. It should be appreciated that FIGS. 2, 3 and 4 comprise some operations and modules which are illustrated with a solid border and some operations and modules which are illustrated with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations do not need to be performed in order.

Figure 2:
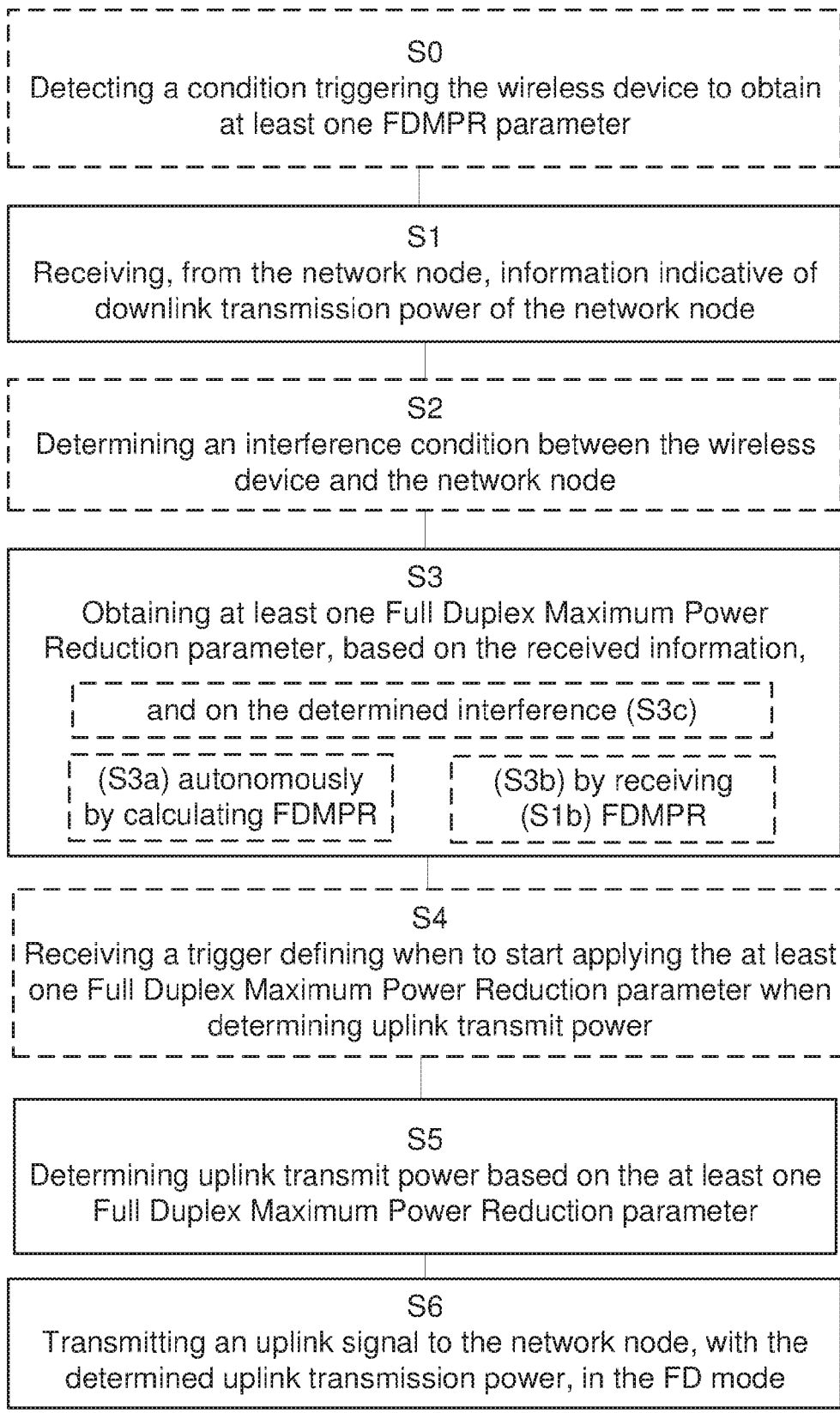
FIG. 2 is a flow chart illustrating the proposed method performed in a wireless device according to some aspects of the disclosure.

FIG. 2 illustrates methods performed in a wireless device 10 and FIG. 3 illustrates corresponding methods performed in a network node 20. FIG. 4 illustrates the signalling between the wireless device 10 and the network node 20, when performing the respective methods. FIG. 4 is therefore not described in further detail.

Example Node Operations in a Wireless Device

The methods are e.g. performed in the wireless device of FIG. 1, when a wireless device communicates with a network node in Full Duplex, FD, communication.

This disclosure proposes a method, performed in a wireless device 10, being served by a network node 20, for controlling Full Duplex, FD, transmission power. As discussed above, this disclosure proposes how to calculate Full Duplex maximum power reduction parameters. The network node 20 (e.g. wireless access point, base station, eNodeB) signals the Full Duplex maximum power reduction parameters to the wireless device. However, the Full Duplex Maximum Power Reduction, FD-MPR, may also be pre-defined as a function of e.g. the channel configuration of the wireless device and the network node. In other words, the wireless device can determine which Maximum Power Reduction to use based on which power the network node intends to use for the downlink.

Hence, there are two different scenarios that may be used singly or in combination. In the first scenario the wireless device signals information about channel configuration, typically downlink transmission power and can then, by using predefined functions calculate Maximum Power Reduction on its own. Alternatively, a Maximum Power Reduction parameter, which is calculated taking into account the downlink transmission power is signalled. Stated differently, the Maximum Power Reduction parameter signalled from the network node implicitly defines the downlink transmission power.

The at least one Full Duplex maximum power reduction parameter comprises for example one Full Duplex Maximum Power Reduction parameter and/or one Full Duplex Additional Maximum Power Reduction parameter, FD-A-MPR parameter, see above. However, other parameter sets are also possible. The FD-MPR and FD-A-MPR differ in that they are derived based on different sets of parameters. As an example, the FD-MPR is typically derived based on Downlink transmission, DL Tx, power of the network node and one or more of: number of UL physical channels, UL modulation type (e.g. QPSK, 16 QAM, 64 QAM etc.). On the other hand, as an example, the FD-A-MPR may be typically derived based on DL Tx power of the network node, UL frequency band, UL channel bandwidth and number of UL physical channels and/or self-interference suppression capability.

In other words the proposed method in a wireless device comprises receiving, S1, from the network node, information indicative of a downlink transmission power, DL TX power, of the network node 20. Stated differently, information is signalled from the network node 20 to the wireless device 10, see FIG. 4. The information either directly or implicitly defines the DL TX power.

According to some aspects, the receiving S1 comprises receiving S1b at least one Full Duplex maximum power reduction parameter calculated based on (i.e. implicitly defining) downlink transmission, DL Tx, power, from the network node. Alternatively, the method comprises receiving information that explicitly defines the DL Tx power. The DL Tx power of the network node 20 in the above example can be any one of: the average Tx power measured over certain time period (T0), instantaneous Tx power in a time, expected Tx power in the next one or more time resources etc. Examples of time resource are symbol, time slot, subframe, frame etc.

The method further comprises, obtaining S3 at least one Full Duplex maximum power reduction parameter, based on the received information. If the information indicative of a downlink transmission power is the Full Duplex Maximum Power Reduction parameter, then this step is implicit. Hence, the step of receiving S1 and obtaining S3, is then implemented by the reception of at least one Full Duplex maximum power reduction parameter calculated by the network. However, calculations in the wireless device may also be required. Then, the obtaining S3 comprises autonomously obtaining S3a at least one Full Duplex maximum power reduction parameter in the wireless device, based on the received information. For example, FD-MPR and FD-A-MPR are derived based on at least the transmit power of the network node serving the wireless device in FD mode and also on one or more parameters related to UL transmissions of the wireless device. Those calculations will be described in further detail below. Stated differently, the obtaining S3 comprises calculating at least one Full Duplex maximum power reduction parameter based on at least one parameter related to uplink transmissions from the wireless device and on at least one parameter related to downlink transmissions from the network node. In conclusion, the Full Duplex Maximum Power Reduction parameters are calculated in the network node or in the wireless device, or in a combination. In any case information about DL Tx power is required.

The method further comprises, determining S5 uplink transmission power based on the at least one Full Duplex maximum power reduction parameter. The Full Duplex Maximum Power Reduction parameter parameters must be taken into account by a transmit power control algorithm when the wireless device determines the uplink, UL, transmit power, whenever the wireless device transmits on BFD or TNFD radio bearers. For example, the wireless device estimates uplink transmission power using power control mechanisms. The estimated uplink transmission power is then adjusted i.e. reduced, in accordance with the Full Duplex Maximum Power Reduction parameter.

The method finally comprises, transmitting S6 an uplink signal to the network node, with the determined uplink transmission power, in the FD mode. Hence, the wireless device transmits data and simultaneously receive data on the same band in FD mode, see FIG. 4. The data is transmitted with the downlink transmission power indicated in step S1. In this way the total emitted power can be controlled, as will be further explained below.

In another exemplary implementation the wireless device 10 may be initially configured by the network node with the initial values of e.g. FD-MPR and/or FD-A-MPR. Subsequently, the wireless device may autonomously adjust or modify the values of FD-MPR and/or FD-A-MPR based on any change in the values of the DL and/or UL transmission parameters. In other words, according to some aspects, the wireless device is already configured with at least one Full Duplex Maximum Power Reduction, parameter and wherein the application of the obtained, Full Duplex Maximum Power Reduction, parameters implies an adjustment of the present Full Duplex maximum power reduction parameters.

One core principle of the proposed methods, is that the FD-MPR value is adjusted or modified based on at least the TX power of the network node serving the wireless device in the FD mode even if the transmission parameters of the wireless device related to FD-MPR remain the same. Similarly, the FD-A-MPR value is adjusted or modified based on at least the TX power of the network node serving the wireless device in the FD mode even if the transmission parameters of the wireless device related to the FD-A-MPR remain the same.

In one exemplary implementation the values of the FD-MPR and FD-A-MPR may be adjusted or changed by the amount equal to the change in the network node TX power. In another exemplary implementation the values of the FD-MPR and FD-A-MPR may be not be adjusted or changed by the amount equal to the change in the network node Tx power.

For example, in the latter case the network node may derive the new values of FD-MPR and FD-A-MPR by taking into account the radio conditions between the wireless device and the network node. The radio conditions between them can be determined based on one or more of the following radio measurements: path loss between the wireless device and the network node, geometry factor between the wireless device and the network node, wireless device signal strength with regards to the network node, wireless device signal quality with regards to the network node etc. Any of these measurements can be performed by the wireless device on signals received from the network node or by the network node on signals received from the wireless device. In yet another example, certain minimum values of FD-MPR and FD-A-MPR are applied even if the TX power of the network node is decreased by more than the values of the FD-MPR and FD-A-MPR.

The modified values of the FD-MPR and FD-A-MPR are signaled to the wireless device. The wireless device uses the modified values to reduce its maximum power when transmitting the UL signals. This is explained with few examples below.

In a first example assume that the current network node TX power is 30 dBm while the current value of FD-MPR and FD-A-MPR are 2 dB and 3 dB respectively. Further assume that the network TX power has been reduced to 28 dBm (e.g. due to low DL data rate etc.). In this example the network node adjusts the FD-MPR and FD-A-MPR by the same amount as network node power reduction i.e. by 2 dB. Therefore the new values of FD-MPR and FD-A-MPR would be 0 dB and 1 dB respectively.

In a second example, also assume that the current network node TX power is 30 dBm while the current value of FD-MPR and FD-A-MPR are 2 dB and 3 dB respectively. The network Tx power has been reduced to 28 dBm (e.g. due to low DL data rate etc.). In this example the network node does not reduce the FD-MPR and FD-A-MPR by 2 dB. In this example the network node determines the interference situation between the wireless device and the network node. If the signal strength (e.g. path loss etc.) is above a threshold then the network node may decrease the FD-MPR and FD-A-MPR by certain amount e.g. FD-MPR and FD-A-MPR to 1 dB and 2 dB respectively. But otherwise the network may keep the previous values of the FD-MPR and FD-A-MPR i.e., 2 dB and 3 dB respectively.

In a third example also assume that the current network node TX power is 30 dBm while the current value of FD-MPR and FD-A-MPR are 2 dB and 3 dB respectively. The network TX power has been reduced to 25 dBm (e.g. due to low DL data rate etc.). In this example the network node maintains the FD-MPR and FD-A-MPR at certain minimum level regardless of the network TX power. Assume that the minimum values of both FD-MPR and FD-A-MPR are 1 dB. Therefore the new values of FD-MPR and FD-A-MPR would still be 1 dB and 1 dB respectively.

In a fourth example it is assumed that the current network node TX power is reduced by X dB (e.g. 2 dB) and this change is indicated to the wireless device. The wireless device then autonomously modifies the values of FD-MPR and/or FD-A-MPR according to the rules described in any of the preceding examples 1-3.

According to some aspects, there are triggering conditions for when the wireless device should obtain Full Duplex maximum power reduction parameters. This could be when setting up the FD mode or when moving from half duplex MPR to full MPR. There could also be measurements triggering that new Full Duplex maximum power reduction parameters needs to be obtained. Another scenario is cell reselection etc. The obtaining could also be triggered by system load or when path loss is below a threshold. The wireless device can autonomously request the Full Duplex maximum power reduction parameters (or information needed to autonomously obtain the Full Duplex Maximum Power Reduction parameter in the wireless device) from the network node using RRC signaling, e.g. during RRC connection establishment after the wireless device has performed an attach procedure to the network. In other words, according to some aspects, the proposed method also comprises detecting S0 a condition triggering the wireless device to obtain at least one Full Duplex maximum power reduction parameter. The other steps are then performed in response to the detection of the trigger. Further examples will be described in further detail below.

According to some aspects, the method also comprises receiving S4 (or detecting) a trigger defining when to start applying the at least one Full Duplex maximum power reduction parameter when determining S5 uplink transmission power. The trigger is e.g. received from the network node 20. The following are example of triggers that the wireless device uses to determine when to apply the FDx parameters in its transmit power setting procedure.

In a first example, a wireless device receives a Transmit Power Control, TPC, command from the network node, e.g. base stationor eNodeB. In LTE, the TPC command can be sent in two modes (accumulative TPC command or absolute TPC commands). According to the present solution, the FDx trigger can be part of both types of TPC commands.

In another example, RRC connection reconfiguration follows a FD radio bearer setup procedure. The trigger to start applying the FDx parameters can then be part of the RRC connection reconfiguration command that is used to configure the full duplex radio bearer allocated to the wireless device.

Alternatively, a RRC Connection Setup contains the trigger: The trigger to start applying the FDx parameters can be part of the RRC Connection Setup (Establishment) procedure that is used to establish the full duplex radio bearer allocated to the wireless device.

According to some aspects, the method also comprises determining S2 an interference condition between the wireless device 10 and the network node 20. Then, the at least one Full Duplex maximum power reduction parameter, is also obtained S3b based on the determined interference condition. Then the interference condition is determined S2 based for example on one or more of: received interference, geometry factor, path loss, signal strength and signal quality and/or self-interference suppression capability.

Example Node Operations in a Network Node

The disclosure also relates to corresponding methods performed in a network node. The methods are e.g. performed in the network node 20 of FIG. 1, when a wireless device communicates with the network node in Full Duplex, FD, communication. Hence, according to some aspects this disclosure proposes a method, performed in a network node 20, network node 20 served by a network node 20, serving a wireless device, for controlling Full Duplex, FD, transmission power.

In FD mode, the network node needs to provide information to the wireless device, in order for the wireless device to be able to obtain correct Maximum Power Reduction parameter, as the same resources are used in both directions and as there may be restrictions applying to the entire resource. Hence, the network node 20 needs to signal either the Maximum Power Reduction parameter(s) or the information needed to obtain the Maximum Power Reduction parameter in the wireless device. The procedure is initiated by some kind of trigger condition.

In an initial step, the method comprises detecting S10 a condition indicating that at least one full duplex maximum power reduction, Full Duplex Maximum Power Reduction parameter needs to be obtained by the wireless device. For example the wireless device indicates to the network node that the Full Duplex maximum power reduction parameters are outdated. Or there are no Full Duplex maximum power reduction parameters available. This could be when setting up the FD mode or when moving from half duplex MPR to full MPR. There could also be measurements triggering that new Full Duplex maximum power reduction parameters needs to be obtained. Another scenario is cell reselection.

Example situations triggering the network node 20 to signal the Full Duplex maximum power reduction parameters, here generally referred to as FDx, to a wireless device, will now be described using LTE as an example.

Figure 5:
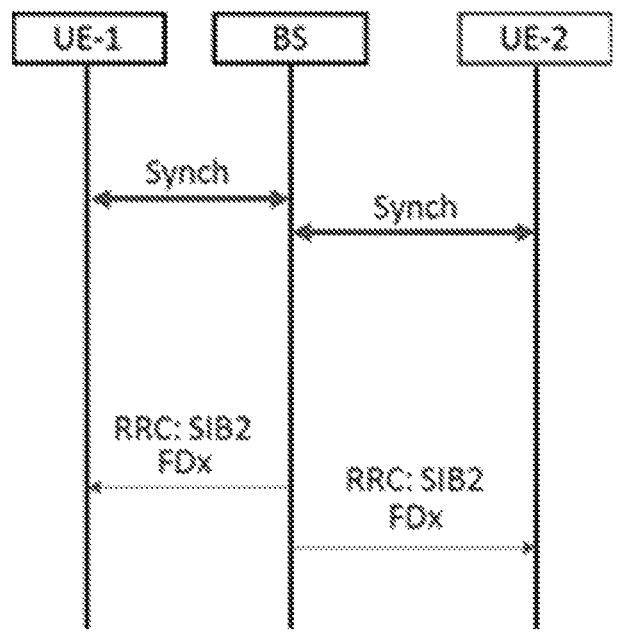
FIG. 5 synchronization between wireless device and base station followed by broadcasting the FD-MPR and FD-A-MPR (FDx) parameters to wireless devices camping on the cell.

According to some aspects, FDx can be part of information elements, IE, of the System Information Block, SIB, as part of the radio resource configuration information that is common for all wireless devices in the cell (e.g. SIB Type 2). In this case, the wireless device learns the FDx parameters when it performs cell change (e.g. cell reselection, completes a handover or RRC re-establishment etc) procedure to a cell that supports FD communication, i.e. FD bearers. FIG. 5 illustrates synchronization between wireless device and base station followed by broadcasting the FD-MPR and FD-A-MPR (FDx) parameters to wireless devices camping on the cell.

Figure 6:
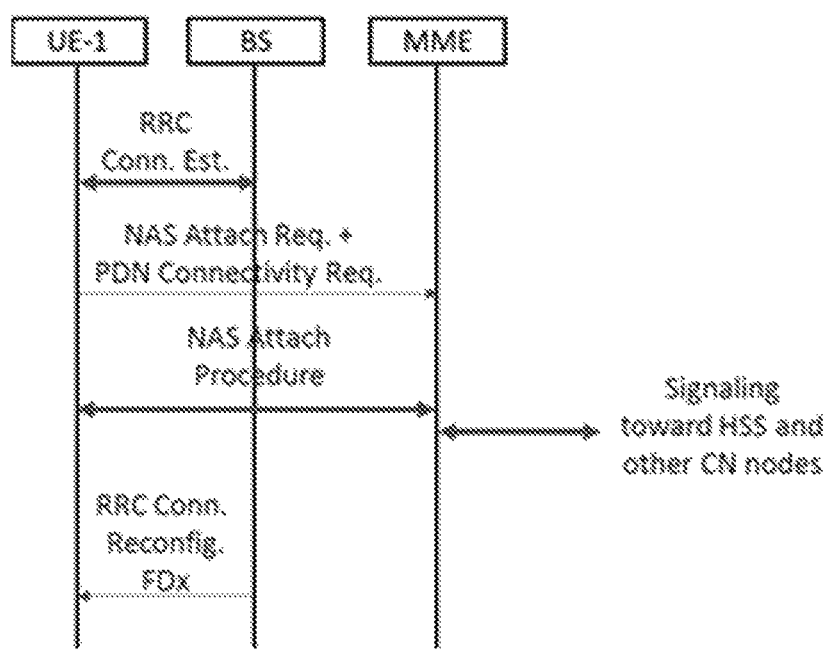
FIG. 6 using dedicated signalling (RRC Reconfiguration) to send the FDx parameters to the wireless device.

The FDx parameters can also be signalled to the wireless device by dedicated Radio Resource Control, RRC, signaling as part of the establishment, configuration, maintenance and release of point-to-point radio bearers, RB, and the QoS management associated with RBs. This RRC signaling can be triggered by a RB Setup Request message e.g. from the core network, e.g. by the Mobility Management Entity, MME, to the BS. FIG. 6 illustrates using dedicated signaling (RRC Reconfiguration) to send the FDx parameters to the wireless device.

According to some aspects, the FDx parameters are signaled as part of the RRC connection establishment triggered by e.g. a paging request by the MME.

In other words, the disclosure proposes that the network node provides S13, in response to the detecting S10, information indicative of downlink transmission power of the network node and/or at least one Full Duplex maximum power reduction parameter calculated based on the downlink transmission power of the network node, to the wireless device. In other words the network node 20 provides the Full Duplex Maximum Power Reduction, here referred to as FDx, or information usable by the wireless device to obtain FDx. The wireless device can upon receiving this information obtain a Maximum Power Reduction parameter and determine uplink transmission power based on the at least one Full Duplex maximum power reduction parameter, as described above in relation to FIG. 2.

The at least one Full Duplex maximum power reduction parameter comprises for example one Full Duplex Maximum Power Reduction parameter and/or one Full Duplex Additional Maximum Power Reduction parameter, FD-A-MPR parameter, see above.

The following example procedures can be used to provide S13, typically signal, the Full Duplex Maximum Power Reduction parameter, FDx parameters (or information usable by the wireless device to obtain FDx) to the wireless device, using LTE as an example.

RRC Connection Setup:

The RRC Connection Setup comprises Connection Request, RRC Connection Setup and RRC Connection Setup Complete. The FDx parameters can be signaled to the wireless device when the network node sends the RRC connection setup message to the wireless device as part of the RRC connection establishment procedure.

Non-Access Stratum, NAS, Attach Procedure:

(i.e. RRC Connection Reconfiguration): The NAS Attach procedure is used by the wireless device to receive NAS-level services (e.g. Internet connectivity). The NAS Attach procedure enables the network to know about the wireless device. The NAS Attach procedure is mandatory for the wireless device at power on and during initial access of the network. During or followed by the NAS Attach procedure, the base station can reconfigure the resources allocated to the wireless device by sending an RRC Connection Reconfiguration Request to the wireless device. The FDx parameters can be signaled as information elements of the RRC Connection Reconfiguration message.

Mobile Originated Data Call:

When the wireless device has successfully attached to the network, it can request services (NAS Service Request) from the core network using NAS signaling procedures. As part of the this procedure, the base station typically allocates radio resources to the radio bearers necessary to deliver that service to the wireless device. The FDx parameters can be signaled as part of the radio bearer setup (and associated RRC Connection Reconfiguration).

The network node then transmits a downlink signal S15 to the wireless device in the Full Duplex mode, with the downlink transmission power indicated to the wireless device. Because the wireless device has been informed about the downlink transmission power, it may adapt its own transmission power in order to exceed any limits.

As discussed above, one or more of the Full Duplex maximum power reduction parameters may be calculated in the network node. In other words, according to some aspects, the method comprises calculating S12 at least one Full Duplex maximum power reduction parameter based on at least one parameter related to uplink transmissions from the wireless device and on at least one parameter related to downlink transmissions from the network node. Principles for calculating Full Duplex Maximum Power Reduction parameter will be presented in more detail below.

According to some aspects the method further comprises determining S11 an interference condition between the wireless device 10 and the network node 20. Then, the at least one Full Duplex maximum power reduction parameter, is also calculated S12 based on the determined interference condition. The interference condition is determined S11 based for example on one or more of: received interference, geometry factor, path loss, signal strength and signal quality.

According to some aspects the method further comprises transmitting S14 a trigger defining when to start applying the at least one Full Duplex maximum power reduction parameter, to the wireless device. This has already been described in connection with the wireless device and step S4.

Principles for Calculating Full Duplex Maximum Power Reduction Parameters

Principles for calculating Full Duplex maximum power reduction parameters applicable in the network node or in the wireless device will now be described in further detail.

The values of Full Duplex maximum power reduction parameters such as FD-MPR and FD-A-MPR are derived based on parameters related to the wireless device uplink transmissions as well as parameters related to the network node downlink transmissions. For example, FD-MPR and FD-A-MPR are derived based on at least the transmit power of the network node serving the wireless device in FD mode and also on one or more parameters related to UL transmissions of the wireless device.

Examples of parameters related to UL transmissions of the wireless device are; modulation type and coding scheme of uplink, UL, signals transmitted by the wireless device in the FD mode, number of UL physical channels used in the FD mode (e.g. number of physical resource blocks, RBs, in LTE systems), UL channel bandwidth, a location of the UL physical channels used in FD Mode within the UL channel bandwidth, UL frequency band or carrier frequency, wireless device maximum UL transmission power (i.e. UE max nominal power) etc. Channel bandwidth is interchangeably called as transmission bandwidth, RF bandwidth etc. within the UL channel bandwidth the UE can be assigned one or more UL physical channels for uplink transmission of signals. The UL channel bandwidth is the amount of frequency domain resources used by the UE (expressed, for example, in terms of physical resource blocks in LTE) to transmit communication signals. In another exemplary implementation the FD-MPR and FD-A-MPR can be based on more than one DL transmission parameters of the network node serving the wireless device in FD mode and also on one or more parameters related to UL transmissions of the wireless device.

Examples of parameters related to DL transmissions of the network node are; downlink, DL, transmission power of the network node serving the wireless device in the FD mode, modulation type and coding scheme of DL signals transmitted by the network node serving the wireless device in FD mode, a number of DL physical channels used in the FD mode (e.g. number of physical resource blocks, RBs), DL channel bandwidth (i.e. cell transmission bandwidth as defined in 3GPP), a location of the DL physical channels used in FD mode within the DL channel bandwidth, DL frequency band or carrier frequency. The frequency band contains one or more carrier frequencies. The carrier frequency is defined or addressed by a frequency number or radio channel frequency number. Examples of radio channel frequency number is absolute radio frequency channel number, ARFCN, E-UTRAN ARFCN, EARFCN, etc. The radio channel frequency numbers are different for UL carrier frequency and downlink frequency number.

According to some aspects, the at least one Full Duplex maximum power reduction parameter is calculated such that the total power transmitted power from the wireless device and from the network node on a commonly used physical resource will stay below a predefined total emitted power level. A physical resource is e.g. a resource block, but it can also be a time slot, subframe or other physical unit.

The predefined total emitted power is based on a maximum total emitted power for out-of-band transmissions or on requirements concerning spurious emissions.

Offline Procedure to Determine the Out-of-Band Transmission Levels

When the wireless device and the base station are engaged in FD communications (either bidirectional FD or three-node FD), the measurable emitted sum energy level depends on the location of the measuring device in relation to the wireless device and the base station. Therefore, to configure the appropriate values of the FDx parameters, the following procedure can be used.

A measuring device, measuring the received signal energy on predefined resource elements, is placed at predefined reference points along the line connecting the wireless device and the BS. The total emitted power and total OOB energy level must not exceed the predetermined threshold values on any of the predefined reference points.

Figure 7A:
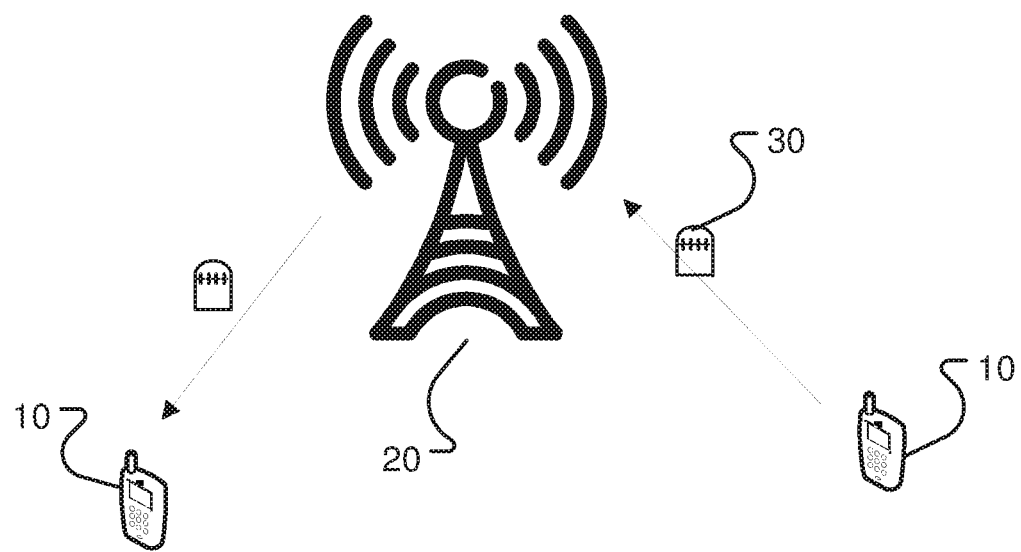
FIG. 7 illustrate employing a measuring device to measure the unwanted emissions (spurious emissions) at an arbitrary point between the wireless device and base station antennas to determine the sum (UE+BS) out-of-band transmission levels at different points between the base station and the wireless device.
Figure 7B:
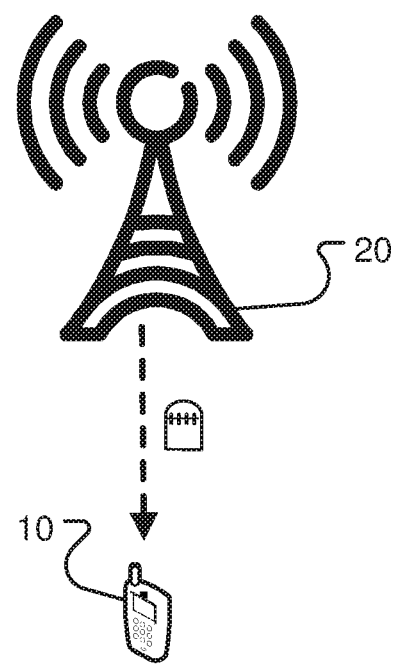

FIGS. 7a and 7b illustrate employing a measuring device to measure the unwanted emissions (spurious emissions) at an arbitrary point between the wireless device and base station antennas to determine the sum (wireless device+BS) out-of-band transmission levels at different points between the base station and the wireless device.

FIG. 7a illustrates measurements in Three-Node FD, TNFD, communication where a FD capable communicates with two other (not necessarily FD capable) nodes. In this example, the FD capable node transmits and receives signals to/from the non-FD capable nodes on the same frequency channel simultaneously. Measurements are then performed at two points between the respective wireless devices and the access point.

FIG. 7b illustrates measurements in Bidirectional full duplex, BFD, wherein the communication involves a pair of FD capable nodes that send and receive signals to one another on the same frequency channel at the same time. Measurements are then performed between the wireless device and the access point.

Example Implementations in a Wireless Device

Figure 8:
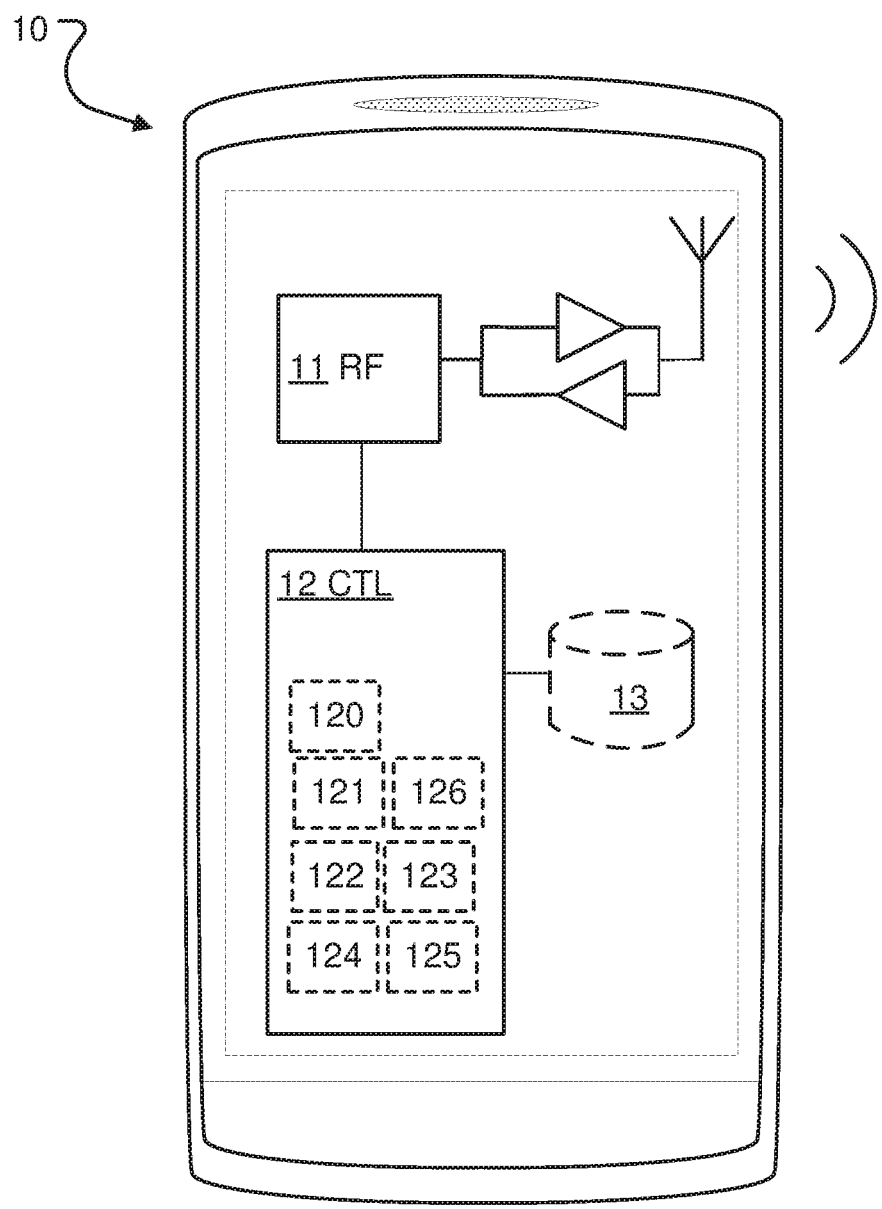
FIG. 8 depicts an exemplifying wireless device according to some example embodiments.

FIG. 8 illustrates an example wireless device, according to some of the example embodiments, wherein the wireless device configured for controlling transmission power of Full Duplex, FD, transmissions, and which may incorporate some of the example wireless device operation embodiments discussed above or below.

Within the context of this disclosure, the terms "wireless terminal" or "wireless device" encompass any device which is able to communicate wirelessly with another device, as well as, optionally, with an access node of a wireless network by transmitting and/or receiving wireless signals. Thus, the term "wireless device" encompasses, but is not limited to: a user equipment, e.g. an LTE UE, a mobile terminal, a stationary or mobile wireless device for machine-to-machine communication, an integrated or embedded wireless card, an externally plugged in wireless card, a dongle etc. Throughout this disclosure, the term "user equipment" is sometimes used to exemplify various embodiments. However, this should not be construed as limiting, as the concepts illustrated herein are equally applicable to other wireless devices. Hence, whenever a "user equipment" or "UE" is referred to in this disclosure, this should be understood as encompassing any wireless device as defined above.

As shown in FIG. 8, the wireless device 10 may comprise a radio communication interface or radio circuitry 11 configured to receive and transmit any form of communications or control signals within a network (not shown). In particular the radio circuitry 11 is configured for Full Duplex, FD, communication with a network node.

It should be appreciated that the radio communication interface 11 may be comprised as any number of transceiving, receiving, and/or transmitting units or circuitry. It should further be appreciated that the radio communication interface 11 may be in the form of any input/output communications port known in the art. The radio communication interface 11 may comprise RF circuitry and baseband processing circuitry (not shown).

The wireless device 10 may further comprise at least one memory unit or circuitry 13 that may be in communication with the radio communication interface 11. The memory 13 may be configured to store received or transmitted data and/or executable program instructions. The memory 13 may be any suitable type of computer readable memory and may be of volatile and/or non-volatile type. According to some aspects, the disclosure relates to a computer program comprising computer program code which, when executed in a first wireless device, causes the first wireless device to execute any aspect of the example node operations described above.

The wireless device 10 may further comprise processing circuitry 12 which may be configured to cause the wireless device 10 to receive from the network node, information indicative of a downlink transmission power of the network node and to obtain at least one Full Duplex maximum power reduction parameter, based on the received information. The processing circuitry 12 is further configured to cause the wireless device 10 to determine uplink transmission power based on the at least one Full Duplex maximum power reduction parameter and to transmit an FD uplink signal to the network node with the determined uplink transmission power.

The processing circuitry 12 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry need not be provided as a single unit but may be provided as any number of units or circuitry.

According to some aspects the wireless device 10 or the processing circuitry 12 comprises modules configured to perform the methods described above. Hence, according to some aspects, the processing circuitry 12 comprises a detector 120 configured to cause the wireless device to detect a condition triggering the wireless device to obtain at least one FDMPR parameter.

According to some aspects network node comprises a first receiver module 121 configured to cause the wireless device to receive, from the network node, information indicative of downlink transmission power of the network node.

According to some aspects network node comprises a determiner 122 configured to cause the wireless device to determine an interference condition between the wireless device and a network node.

According to some aspects network node comprises an obtainer 123 configured to obtain at least one Full Duplex maximum power reduction parameter, based on the received information.

According to some aspects network node comprises a second receiver module 124 configured to cause the wireless device to receive a trigger defining when to start applying the at least one Full Duplex maximum power reduction parameter when determining uplink transmit power.

According to some aspects network node comprises a determiner 125 configured to cause the wireless device to determine uplink transmit power based on the at least one Full Duplex maximum power reduction parameter.

According to some aspects network node comprises a transmitter module 126 configured to cause the wireless device to transmit an uplink signal to the network node, with the determined uplink transmission power, in the FD mode.

The detector 120, first receiver module 121, the determiner 122, the obtainer 123, the second receiver module 124, the determiner 125 and the transmitter module 126 are implemented in hardware or in software or in a combination thereof. The modules 120, 121, 122, 123, 124, 126 are according to some aspects implemented as a computer program modules stored in the memory 13 which run on the processing circuitry 12. The wireless device 10 is further configured to implement all the aspects of the disclosure as described in relation to the methods above.

Example Implementations in a Network Mode

Figure 9:
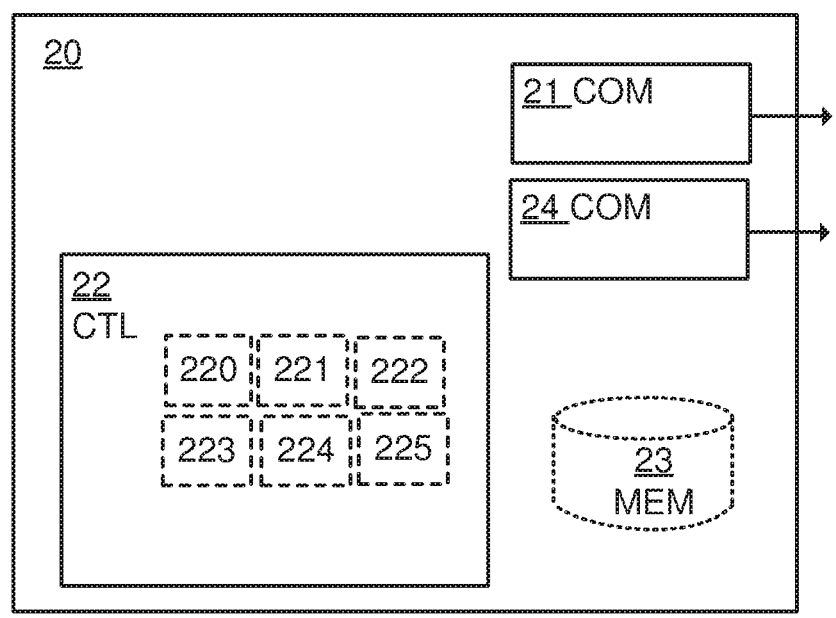
FIG. 9 depicts an exemplifying network node according to some example embodiments.

Turning now to FIG. 9, a schematic diagram illustrating some modules of an example embodiment of a network node 20 configured of the proposed method, for controlling Full Duplex, FD, and transmission power. The network node 20 is typically a radio network node or base station, such as an eNodeB in LTE, providing wireless access to wireless devices within one or more areas referred to as cells.

The network node 20 comprises a controller, CTL, or a processing circuitry 22 that may be constituted by any suitable Central Processing Unit, CPU, microcontroller, Digital Signal Processor, DSP, etc. capable of executing computer program code. The computer program may be stored in a memory, MEM 23. The memory 23 can be any combination of a Read And write Memory, RAM, and a Read Only Memory, ROM. The memory 23 may also comprise persistent storage, which, for example, can be any single one or combination of magnetic memory, optical memory, or solid state memory or even remotely mounted memory.

The network node 20 further comprises a radio communication interface (i/f), 21. The wireless communication interface 21 is arranged for wireless communication with other network nodes within range of the network node 20. The radio communication interface 21 may be adapted to communicate over one or several radio access technologies. If several technologies are supported, the node typically comprises several communication interfaces, e.g. one WLAN or Bluetooth communication interface and one cellular communication interface.

As shown in FIG. 9, the network node 20 according to some aspects comprises a network communication interface 24. The network communication interface 24 is configured for communication with other network nodes e.g. in a core network. This communication is often wired e.g. using fiber. However, it may as well be wireless.

The processing circuitry 22 is configured to cause the network node 20 to detect a condition indicating that at least one full duplex maximum power reduction, Full Duplex Maximum Power Reduction, parameter needs to be obtained by the wireless device, to provide, in response to the detecting, information indicative of downlink transmission power of the network node and/or at least one Full Duplex maximum power reduction parameter calculated based on the downlink transmission power of the network node, to the wireless device. The processing circuitry 24 is further configured to cause the network node 20 to transmit a FD data signal in the Full Duplex mode with the downlink transmission power indicated to the wireless device.

According to some aspects the processing circuitry 22 or the network node 20 comprises modules configured to perform the methods described above.

According to some aspects network node comprises a detector 220 configured to detect a condition indicating that at least one full duplex maximum power reduction, Full Duplex Maximum Power Reduction, parameter needs to be obtained by the wireless device, According to some aspects network node comprises a calculator 221 configured to calculate at least one Full Duplex maximum power reduction parameter based on at least one parameter related to uplink transmissions from the wireless device and on at least one parameter related to downlink transmissions from the network node According to some aspects network node comprises a determiner 222 configured to determine an interference condition between the wireless device and the network node According to some aspects network node comprises a provider 223 configured to provide, in response to the detecting, information indicative of downlink transmission power of the network node and/or at least one Full Duplex maximum power reduction parameter calculated based on the downlink transmission power of the network node, to the wireless device.

According to some aspects network node comprises a first transmitter module 224 configured to transmit a trigger defining when to start applying the at least one Full Duplex maximum power reduction parameter, to the wireless device According to some aspects network node comprises a second transmitter module 225 configured to transmit a FD data signal in the Full Duplex mode with the downlink transmission power indicated to the wireless device.

The detector 220, the calculator 221, the determiner 222, the provider 223, the first transmitter module 224 and the second transmitter module 225 are implemented in hardware or in software or in a combination thereof. The modules 220, 221, 222, 223, 224, 225 are according to some aspects implemented as a computer program modules stored in a memory 23 which run on the processing circuitry 22. The first network node 20 is further configured to implement all the aspects of the disclosure as described in relation to the methods above.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The invention claimed is:

1. A method, performed in a wireless device being served by a network node, the method comprising:
   receiving information from the network node that indicates a downlink transmission power of the network node with respect to a Full Duplex (FD) radio bearer;
   determining a FD Maximum Power Reduction (FD MPR) parameter in dependence on the downlink transmission power and on one or more uplink transmission parameters associated with the wireless device transmitting on the FD radio bearer; and
   limiting a transmit power of the wireless device with respect to the FD radio bearer, according to the FD MPR parameter.

2. The method of claim 1, wherein determining the FD MPR parameter is performed in response to any one or more of: setting up an FD mode of operation, changing from Half Duplex (HD) operation to FD operation, performing cell reselection, a propagation path loss to the network node falling below a threshold, and receiving signaling from the network node.

3. The method of claim 1, wherein limiting the transmit power of the wireless device with respect to the FD radio bearer comprises:
   calculating a FD transmit power limit by applying the FD MPR parameter to a nominal maximum output power value of the wireless device;
   determining, based on defined uplink power control mechanisms and for a given uplink transmission event, an uplink transmission power to use for transmitting on the FD radio bearer; and
   adjusting the determined uplink transmission power, as needed, to avoid exceeding the FD transmit power limit.

4. The method of claim 1, further comprising activating said limiting in response to
   receiving a trigger defining when to start applying the FD MPR parameter when determining uplink transmission power.

5. The method of claim 1, further comprising:
   determining an interference condition between the wireless device and the network node; and
   determining the FD MPR parameter in further dependence on the determined interference condition.

6. The method of claim 5, wherein the interference condition is determined based on one or more of: received interference, geometry factor, path loss, signal strength and signal quality.

7. A method, performed in a network node serving a wireless device, the method comprising:
   determining a Full Duplex Maximum Power Reduction (FD MPR) parameter in dependence on a downlink transmission power of the network node with respect to a FD radio bearer and on one or more uplink transmission parameters associated with the wireless device transmitting on the FD radio bearer; and
   transmitting an indication of the FD MPR parameter to the wireless device, thereby enabling the wireless device to limit a transmit power of the wireless device with respect to the FD radio bearer in accordance with the FD MPR parameter.

8. The method of claim 7, further comprising sending signaling to the wireless device to trigger the wireless device to use the FD MPR parameter to limit its transmit power when transmitting on the FD radio bearer.

9. The method of claim 8, further comprising:
   determining an interference condition between the wireless device and the network node; and
   determining the FD MPR parameter further in dependence on the determined interference condition.

10. The method of claim 9, wherein the interference condition is determined based on one or more of: received interference, geometry factor, path loss, signal strength and signal quality.

11. The method of claim 7, wherein the method comprises:

transmitting to the wireless device a trigger defining when to start applying the FD MPR parameter.

12. The method of claim 7, wherein the FD MPR parameter comprises:
   a first type of power reduction parameter that is used by the wireless device to limit the transmit power of the wireless device in combined dependence on a modulation scheme and a transmission bandwidth associated with the wireless device transmitting on the FD radio bearer; or
   a second type of power reduction parameter that is used by the wireless device as an additional power reduction parameter with respect to a particular frequency band.

13. The method of claim 7, wherein the one or more uplink transmission parameters comprise at least one of:
   a modulation type and coding scheme of uplink (UL) signals transmitted by the wireless device in the Full Duplex mode,
   a number of UL physical channels used in a FM operating mode,
   a UL channel bandwidth,
   a location of the UL physical channels used in the FD operating mode within the UL channel bandwidth,
   a UL frequency band or carrier frequency, or
   a maximum UL transmission power of the wireless device, or a nominal maximum UL transmission power of the wireless device.

14. The method of claim 7, wherein the FD MPR parameter is calculated such that a total power transmitted from the wireless device and from the network node on a commonly used physical resource will stay below a predefined total emitted power level.

15. The method of claim 14, wherein the predefined total emitted power is based on a maximum total emitted power for out-of-band transmissions.

16. The method of claim 14, wherein the predefined total emitted power level is based on requirements concerning spurious emissions.

17. A wireless device comprising:
   radio circuitry configured for Full Duplex (FD) communication with a network node on a FD radio bearer; and
   processing circuitry configured to:
      receive information from the network node that indicates a downlink transmission power of the network node with respect to the FD radio bearer;
      determine a FD Maximum Power Reduction (FD MPR) parameter in dependence on the downlink transmission power and on one or more uplink transmission parameters associated with the wireless device transmitting on the FD radio bearer; and
      limit a transmit power of the wireless device with respect to the FD radio bearer, according to the FD MPR parameter.

18. A network node configured for operation in a communication system and comprising:
   a radio communication interface for Full Duplex (FD) communication with a wireless device on a FD radio bearer;
   a network communication interface configured for communication with other network nodes; and
   processing circuitry configured to:
      determine a FD Maximum Power Reduction (FD MPR) parameter in dependence on a downlink transmission power of the network node with respect to the FD radio bearer and on one or more uplink transmission parameters associated with the wireless device transmitting on the FD radio bearer; and
      transmit an indication of the FD MPR parameter to the wireless device, thereby enabling the wireless device to limit a transmit power of the wireless device with respect to the FD radio bearer in accordance with the FD MPR parameter.

19. A wireless device configured for operation in a communication network, the wireless device comprising:
   radio circuitry configured for communicating with given base stations in the communication network, the radio circuitry operative for Half Duplex (HD) communication and operative for Full Duplex (FD) communication; and
   processing circuitry operatively associated with the radio circuitry and configured to:
      when operating in a Half Duplex (HD) communication mode with respect to a serving base station in the communication network, account only for an uplink transmit power of the wireless device when determining a power reduction to impose on a maximum transmit power of the wireless device with respect to a certain combination of modulation scheme and uplink transmission bandwidth, or with respect to a certain frequency band; and
      when operating in a Full Duplex (FD) communication mode with respect to a serving base station in the communication network, account for both the uplink transmit power of the wireless device and a downlink transmit power of the serving base station when determining the power reduction to impose on the maximum transmit power of the wireless device with respect to the certain combination of modulation scheme and uplink transmission bandwidth, or with respect to the certain frequency band.

20. A wireless device configured for operation in a communication network, the wireless device comprising:
   radio circuitry configured for communicating with given base stations in the communication network, the radio circuitry operative for Half Duplex (HD) communication and operative for Full Duplex (FD) communication; and
   processing circuitry operatively associated with the radio circuitry and configured to:
      for HD communication with a currently serving base station in the communication network:
         determine a first power reduction to be imposed by the wireless device with respect to a maximum transmit power of the wireless device, for transmitting with a certain combination of uplink modulation scheme and uplink transmission bandwidth, or when transmitting in a certain frequency band, wherein the first power reduction does not account for a downlink transmission power of the currently serving base station; and
         limit a transmit power of the wireless device according to the first power reduction; and
      for FD communication with a currently serving base station in the communication network:
         determine a second power reduction to be imposed by the wireless device with respect to the maximum transmit power of the wireless device, for transmitting with the certain combination of uplink modulation scheme and uplink transmission bandwidth, or when transmitting in the certain frequency band, wherein the second power reduction accounts for a downlink transmission power of the currently serving base station, such that a total power transmitted from the wireless device and the currently serving base station with respect to physical resources commonly used in FD communication between the currently serving base station and the wireless device does not exceed a predefined total emitted power level; and
limit the transmit power of the wireless device according to the second power reduction.

* * * * *